United States Patent
Chae et al.

(10) Patent No.: US 9,533,573 B2
(45) Date of Patent: Jan. 3, 2017

(54) APPARATUS AND METHOD FOR DRIVING VEHICLE

(71) Applicant: HANWHA TECHWIN CO.,LTD., Changwon-Si (KR)

(72) Inventors: Hee Seo Chae, Changwon (KR); Sung Eun Park, Changwon (KR)

(73) Assignee: Hanwha Techwin Co., Ltd., Changwon-si (KR)

(*) Notice: Subject to any disclaimer, the term of this patent is extended or adjusted under 35 U.S.C. 154(b) by 84 days.

(21) Appl. No.: 14/095,263

(22) Filed: Dec. 3, 2013

(65) Prior Publication Data

US 2015/0051764 A1    Feb. 19, 2015

(30) Foreign Application Priority Data

Aug. 16, 2013   (KR) .................. 10-2013-0097348

(51) Int. Cl.
| | | |
|---|---|---|
| B60K 31/00 | (2006.01) | |
| B60K 6/46 | (2007.10) | |
| B60W 30/14 | (2006.01) | |

(52) U.S. Cl.
CPC .............. *B60K 31/00* (2013.01); *B60K 6/46* (2013.01); *B60W 30/143* (2013.01); *B60W 2540/10* (2013.01); *Y02T 10/6217* (2013.01); *Y10S 903/903* (2013.01)

(58) Field of Classification Search
CPC ....... B60K 31/00; B60K 6/46; Y10S 903/903; B60W 30/143; B60W 2540/10; Y02T 10/6217
USPC .......................................................... 701/22
See application file for complete search history.

(56) References Cited

U.S. PATENT DOCUMENTS

| | | | |
|---|---|---|---|
| 7,383,902 B2 | 6/2008 | Matsuzaki et al. | |
| 7,397,149 B2 | 7/2008 | Seddiki et al. | |
| 2005/0079953 A1* | 4/2005 | Zieles et al. | 477/185 |
| 2009/0259356 A1* | 10/2009 | Clark et al. | 701/22 |
| 2011/0137503 A1 | 6/2011 | Koide et al. | |
| 2012/0109437 A1* | 5/2012 | Iwase et al. | 701/22 |
| 2013/0226377 A1* | 8/2013 | Stanek et al. | 701/22 |
| 2014/0005869 A1* | 1/2014 | Kubotani | B60L 15/20 701/22 |
| 2014/0195090 A1* | 7/2014 | Takeuchi et al. | 701/22 |
| 2014/0236411 A1* | 8/2014 | Amano | 701/22 |
| 2015/0202966 A1* | 7/2015 | Oyama | B60L 15/2009 701/22 |

FOREIGN PATENT DOCUMENTS

| | | |
|---|---|---|
| JP | 2009-171766 A | 7/2009 |
| KR | 2003-0086422 A | 11/2003 |
| KR | 10-2004-0055702 A | 6/2004 |

OTHER PUBLICATIONS

Oyama et al., JP2014/050195, Aug. 30, 2012 (Machine Translation).*

* cited by examiner

*Primary Examiner* — Courtney Heinle
(74) *Attorney, Agent, or Firm* — Sughrue Mion, PLLC (57) ABSTRACT

Provided is a method of driving a vehicle including: monitoring a power status of the vehicle; and if, during the monitoring the power status of the vehicle, a power failure is detected and a first acceleration command is received, controlling the vehicle to travel at a first speed corresponding to the first acceleration command.

14 Claims, 5 Drawing Sheets

| POWER FAILURE | FAILURE EFFECT | REFERENCE OF DETECTION | COUNTERMEASURE |
|---|---|---|---|
| DC-Link OVERVOLTAGE | POWER SUPPLY FAILURE | DC Link VOLTAGE > PREDETERMINED VOLTAGE [V] (1s) | REDUCING REGENERATIVE BRAKING |
| DC-Link UNDERVOLTAGE 1 | POWER SUPPLY FAILURE | DC Link VOLTAGE < PREDETERMINED VOLTAGE [V] (1s) | REDUCING TRAVELLING LOADS |
| DC-Link UNDERVOLTAGE 2 | POWER SUPPLY UNAVAILABLE | DC Link VOLTAGE > PREDETERMINED VOLTAGE [V] (0.1ms) | REDUCING TRAVELLING LOADS |
| DC-Link OVERCURRENT | POWER SUPPLY FAILURE | DC-Link CURRENT > PREDETERMINED CURRENT [A] (0.5ms) | REDUCING TRAVELLING LOADS & REGENERATIVE BRAKING |
| CONVERTER OVERCURRENT | POWER SUPPLY UNAVAILABLE | BATTERY CURRENT > PREDETERMINED CURRENT [A] | REDUCING TRAVELLING LOADS & REGENERATIVE BRAKING |
| CONVERTER IGBT OVERHEATING | POWER SUPPLY FAILURE | IGBT TEMPERATURE > PREDETERMINED TEMPERATURE [°C] | REDUCING TRAVELLING LOADS |
| CONVERTER INDUCTOR OVERHEATING | POWER SUPPLY FAILURE | INDUCTOR TEMPERATURE > PREDETERMINED TEMPERATURE [°C] | REDUCING TRAVELLING LOADS |
| BATTERY OVERDISCHARGING | POWER SUPPLY FAILURE | AVAILABLE DISCHARGTE POWER EXCEEDING PREDETERMINED POWER (kW) FOR PREDETERMINED PERIOD OF TIME (ms) | REDUCING TRAVELLING LOADS |
| BATTERY OVERCHARGING | POWER SUPPLY FAILURE | AVAILABLE CHARGTE POWER EXCEEDING PREDETERMINED POWER (kW) FOR PREDETERMINED PERIOD OF TIME (ms) | REDUCING TRAVELLING LOADS & REGENERATIVE BRAKING |
| BATTERY CELL OVERVOLTAGE | POWER SUPPLY FAILURE | BATTERY VOLTAGE > PREDETERMINED VOLTAGE [V] (2s) | REDUCING TRAVELLING LOADS & REGENERATIVE BRAKING |
| BATTERY CELL UNDERVOLTAGE | POWER SUPPLY FAILURE | BATTERY VOLTAGE < PREDETERMINED VOLTAGE [V] (2s) | REDUCING TRAVELLING LOADS |
| BATTERY OVERHEATING | POWER SUPPLY FAILURE | TEMPERATURE FOR PREDETERMINED PERIOD OF TIME (ms) > PREDETERMINED TEMPERATURE [°C] | REDUCING TRAVELLING LOADS |
| INVERTER OVERCURRENT | POWER SUPPLY UNAVAILABLE | INVERTER CURRENT > PREDETERMINED CURRENT [A] | REDUCING TRAVELLING LOADS |
| GENERATOR OVERHEATING | POWER SUPPLY FAILURE | WINDING WIRE TEMPERATURE > PREDETERMINED TEMPERATURE [°C] | REDUCING TRAVELLING LOADS |
| INDUCTOR IGBT OVERHEATING | POWER SUPPLY FAILURE | IGBT TEMPERATURE > PREDETERMINED TEMPERATURE [°C] (1s) | REDUCING TRAVELLING LOADS |

APPARATUS AND METHOD FOR DRIVING VEHICLE

CROSS-REFERENCE TO RELATED APPLICATION

This application claims priority from Korean Patent Application No. 10-2013-0097348, filed on Aug. 16, 2013, in the Korean Intellectual Property Office, the disclosure of which is incorporated herein by reference in its entirety.

BACKGROUND

1. Field

Apparatuses and methods consistent with exemplary embodiments relate to a method and apparatus for driving a vehicle and more particularly, to a method and apparatus for driving a vehicle designed to control an increase in driving speed of the vehicle when a power failure occurs during driving.

2. Description of the Related Art

In the related art, a hybrid forklift truck including an acceleration limit unit restricts an acceleration command by referring to a discharge power of a battery. That is, when it is difficult for an electric generator to generate a power load of a motor during acceleration of a vehicle, a response lag may occur, thereby causing excessive discharge of battery power. Thus, the acceleration limit unit of the hybrid forklift truck of the related art controls the forklift truck to operate within an available discharge power range of a battery.

Since an acceleration command limit value is controlled according to an available battery discharge power value in a control logic, a speed limit is maintained at constant slope only in a specific situation such as when a vehicle starts to move and load power increases. Furthermore, in the event of a power failure, the restricting of an acceleration command by the acceleration limit unit may not occur.

SUMMARY

One or more embodiments provide a method and apparatus for driving a vehicle designed to limit an increase in driving speed of the vehicle when a power failure occurs during driving and to allow continuous driving of the vehicle.

Additional aspects will be set forth in part in the description which follows and, in part, will be apparent from the description, or may be learned by practice of the exemplary embodiments.

According to an aspect of an exemplary embodiment, there is provided a method of driving a vehicle including: monitoring a power status of the vehicle; and if, during the monitoring the power status of the vehicle, a power failure is detected and a first acceleration command is received, controlling the vehicle to travel at the a first speed corresponding to the first acceleration command.

The detection of the power failure and the receiving of the first acceleration command occur simultaneously.

The method may further include receiving a second acceleration command; and controlling the vehicle to maintain the first speed or to travel at a second speed corresponding to the second acceleration command while driving at the first speed based on a comparison between the first acceleration command and the second acceleration command wherein the first acceleration command corresponds to a first degree of pressing of an acceleration pedal and the second acceleration command corresponds to a second degree of pressing of the acceleration pedal.

The controlling the vehicle may include controlling the vehicle to maintain the first speed while driving if the second acceleration command is greater than the first acceleration command.

The controlling the vehicle may include controlling the vehicle to travel at the second speed if the second acceleration command is less than the first acceleration command.

The method may further include if a second acceleration command is not received while the vehicle travels at the first speed, gradually decreasing the speed of the vehicle to a stop.

The method may further include suppressing movement of the stopped vehicle in response to the power failure.

The method may further include stabilizing the power failure; and controlling the vehicle to travel at a speed corresponding to a subsequently received acceleration command in response to the stabilized power failure, wherein the stabilizing the power failure comprises at least one of reducing regenerative braking and reducing travelling loads.

The method may further include stabilizing the power failure; and controlling the vehicle to travel at a speed less than or equal to the first speed even in response to the stabilized power failure, wherein the stabilizing the power failure comprises at least one of reducing regenerative braking and reducing travelling loads.

The first speed may correspond to a speed at which the power failure of the vehicle occurs.

According to an aspect of another exemplary embodiment, there is provided an apparatus for driving a vehicle including a calculation/storage unit configured to calculate and configured to store a speed of the vehicle including a first speed and a second speed; and a control unit configured to control the vehicle to travel at a first speed corresponding to a first acceleration command if the control unit detects a power failure and receives the first acceleration command while the control unit monitors a power status of the vehicle.

The control unit may be configured to receive a second acceleration command and configured to control the vehicle to maintain the first speed or to travel at the second speed corresponding to the second acceleration command while driving at the first speed based on a comparison between the first acceleration command and the second acceleration command, wherein the first acceleration command corresponds to a first degree of pressing of an acceleration pedal and the second acceleration command corresponds to a second degree of pressing of the acceleration pedal.

The control unit may be configured to control the vehicle to maintain the first speed while driving at the first speed in response to the second acceleration command being greater than the first acceleration command.

The control unit may be configured to control the vehicle to travel at the second speed received from the calculation/storage unit in response to the second acceleration command being less than the first acceleration command.

In response to the second acceleration command not being received while the vehicle travels at the first speed, the control unit may be configured to gradually decrease the speed of the vehicle to a stop.

The control unit may be configured to suppress movement of the stopped vehicle in response to the power failure.

The detection of the power failure and the receiving of the first acceleration command may occur simultaneously.

In response to the power failure being stabilized by a power controller of the control unit, the control unit may be configured to control the vehicle to travel at a speed corresponding to a subsequently received acceleration command wherein the power controller stabilizes the power failure by performing at least one of reduction of regenerative braking and reduction of travelling loads.

In response to the power failure being stabilized by a power controller of the control unit, the control unit may be configured to control the vehicle to maintain a speed less than or equal to the first speed while driving wherein the power controller stabilizes the power failure by performing at least one of reduction of regenerative braking and reduction of travelling loads.

As described above, the method and apparatus for driving a vehicle according to one or more embodiments of the present invention are adapted to limit an increase in driving speed of the vehicle when a power failure occurs during driving and allow continuous driving of the vehicle, thereby improving driving reliability.

Furthermore, limiting the driving speed during a power failure may allow a driver who failed to notice a display indicating occurrence of the power failure to recognize an abnormal condition of the vehicle.

In addition, the method and apparatus provide a driver with authorities to determine continuance of driving or a decrease in travelling speed in the event of a power failure in a vehicle, thereby removing driver's uneasiness of a failure to control an abnormal condition of the vehicle.

BRIEF DESCRIPTION OF THE DRAWINGS

The above and/or other aspects will become apparent and more readily appreciated from the following description of exemplary embodiments, taken in conjunction with the accompanying drawings of which:

FIG. 3 illustrates a table for explaining detection of a power failure that is monitored by a control unit in the apparatus of FIG. 1 according to an exemplary embodiment;

DETAILED DESCRIPTION

As the present inventive concept allows for various changes and numerous exemplary embodiments, the exemplary embodiments will be illustrated in the drawings and described in detail in the description. However, this is not intended to limit the inventive concept to a particular mode of practice, and it is to be appreciated that the present inventive concept encompasses all changes, equivalents, and substitutes that do not depart from the spirit and technical scope thereof. In the description of the exemplary embodiments, well-known methods will not be described in detail so as not to unnecessarily obscure the essence of the present inventive concept.

While the terms such as "first" and "second" may be used to describe various components, such components must not be limited to the above terms. The terms are used only to distinguish one component from another.

The terms used in the present application are merely used to describe an exemplary embodiment, and are not intended to limit the present inventive concept. Use of singular forms includes plural references as well unless expressly specified otherwise. The terms "comprising", "including", and "having" specify the presence of stated features, numbers, steps, operations, elements, components, and/or a combination thereof but do not preclude the presence or addition of one or more other features, numbers, steps, operations, elements, components, and/or a combination thereof. As used herein, the term "and/or" includes any and all combinations of one or more of the associated listed items. Expressions such as "at least one of," when preceding a list of elements, modify the entire list of elements and do not modify the individual elements of the list.

In the drawings, the dimensions of layers and regions may be exaggerated for clarity. Like reference numerals refer to the like elements throughout. It will also be understood that when a layer, film, region, or substrate is referred to as being "on" another layer, film, region, or substrate, it can be directly on the other layer, film, region, or substrate, or intervening layers may also be present.

The inventive concept may be described in terms of functional block components and various processing steps. Such functional blocks may be realized by any number of hardware and/or software components configured to perform the specified functions. For example, the inventive concept may employ various integrated circuit components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the exemplary embodiments may be implemented with any programming or scripting language such as C, C++, Java, assembler, or the like, with the various algorithms being implemented with any combination of data structures, processes, routines or other programming elements. Functional aspects may be implemented in algorithms that execute on one or more processors. Furthermore, the inventive concept may employ any number of conventional techniques for electronics configuration, signal processing and/or data processing and the like. The words "mechanism", "element", "means", and "construction" are used broadly and are not limited to mechanical or physical embodiments, but may include software routines in conjunction with processors, etc.

The present inventive concept will now be described more fully with reference to the accompanying drawings, in which exemplary embodiments of the present inventive concept are shown. An identical or corresponding component is assigned the same reference numeral and a detailed description thereof will be omitted.

Figure 1:
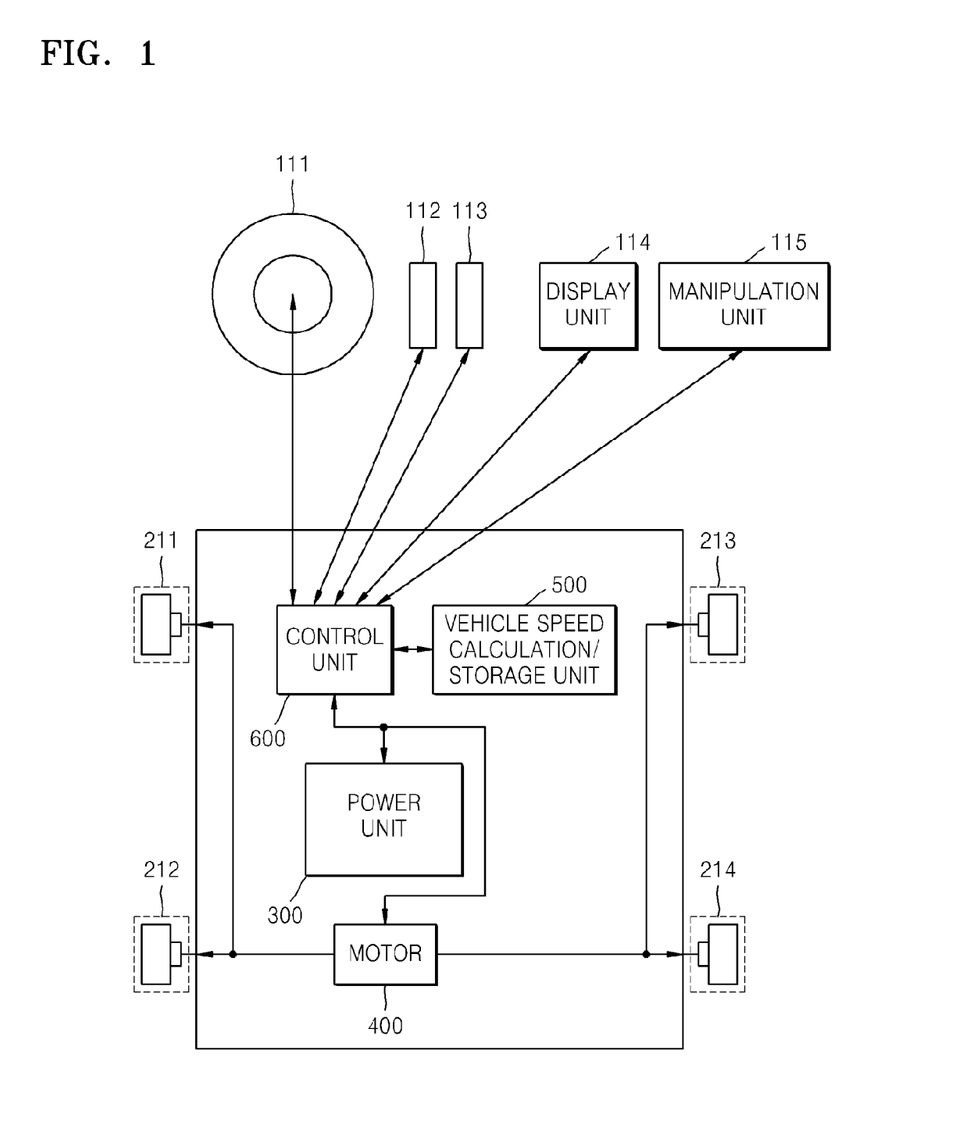
FIG. 1 illustrates an apparatus for driving a vehicle according to an exemplary embodiment.
Figure 2:
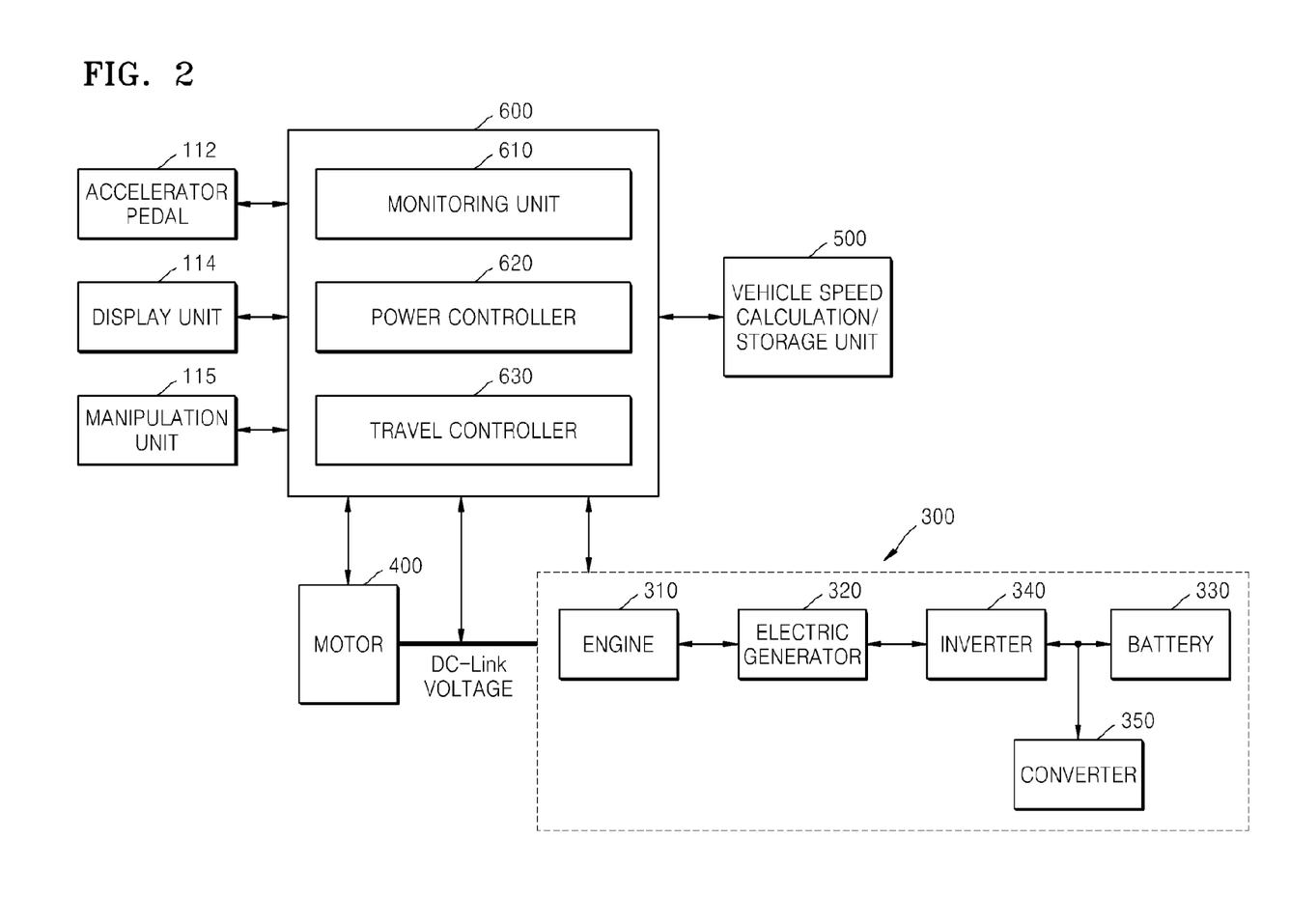
FIG. 2 is a block diagram illustrating a configuration of the apparatus of FIG. 1 according to the exemplary embodiment.

FIG. 1 illustrates an apparatus for driving a vehicle according to an exemplary embodiment, and FIG. 2 is a block diagram illustrating a configuration of the apparatus of FIG. 1 according to the exemplary embodiment.

Referring to FIGS. 1 and 2, the apparatus for driving a vehicle according to the exemplary embodiment includes a steering wheel 111, an accelerator pedal 112, a brake pedal 113, a display unit 114 including an instrument panel and a monitor, a manipulation unit 115 that manipulates the instrument panel and the monitor, wheels 211, 212, 213 and 214, a power unit 300, a motor 400, a vehicle speed calculation/storage unit 500, and a control unit 600.

The power unit 300 is incorporated into a serial-parallel hybrid vehicle or electric car and supplies power thereto.

Referring to FIG. 2, the power unit 300 includes an engine 310, an electric generator 320, a battery 330, an inverter 340, and a converter 350.

The engine 310 serves as a driving source to generate a driving force and is coupled to the electric generator 320. The electric generator 320 generates alternating current (AC) power using power output of the engine 310.

The battery 330 may supply or charge power to drive the vehicle and include a plurality of battery cells. Different rechargeable secondary batteries may be used as the battery cells. For example, the secondary batteries may be nickel (Ni)-cadmium (Cd) batteries, lead (Pb) storage batteries, nickel-metal hydride (NiMH) batteries, lithium (Li)-ion batteries, or Li-polymer batteries.

The vehicle illustrated in FIG. 1 may operate in one of a battery-only mode, an engine-only mode, and a hybrid mode. In the battery-only mode, as the engine 310 stops, the vehicle is driven only by the power supplied by the battery 330. In the engine-only mode in which the power of the battery 330 is interrupted, the vehicle is driven only by an output power of the electric generator 320. In the hybrid mode, the output power of the electric generator 320 is used as main power, and an instantaneously-varying load power is supported by the battery 330.

The inverter 340 is disposed between the electric generator 320 and the battery 330 and converts DC power to AC power or vice versa between the electric generator 320 and the battery 330 for transmission. In detail, the inverter 340 converts AC power generated by the electric generator 320 into DC power and charges the battery 330 with the DC power. The inverter 340 also converts DC power from the battery 330 into three phase AC power and supplies the three phase AC power to the electric generator 320. In this case, the inverter 340 may include at least one Insulated Gate Bipolar Transistor (IGBT) as a switching element in order to convert the DC power into the AC power. The IGBT as a switching element includes a diode and a capacitor and charges or discharges the capacitor according to an on/off operation of the diode.

The converter 350 receives power from the battery 330 and converts the power into low voltage power for operation of low voltage loads such as a headlight (not shown), a brake light (not shown), a direction indicator light (not shown), an engine starter motor (not shown) of the vehicle. In this case, the converter 350 may include at least one IGBT as a switching element in order to convert the DC power into the AC power. The IGBT as a switching element includes a diode and a capacitor and charges or discharges the capacitor according to an on/off operation of the diode The motor 400 drives the wheels 211, 212, 213 and 214 from the power supplied by the power unit 300.

The vehicle speed calculation/storage unit 500 calculates and stores speed of the vehicle corresponding to a degree of the accelerator pedal 112 being pressed by a driver and constantly supplies information about instantaneous vehicle speed to the control unit 600. The vehicle speed calculation/storage unit 500 detects rotational speed of the motor 400 by receiving pulses corresponding to the rotation of the motor 400 and measuring the number of pulses generated per unit time.

The control unit 600 monitors power status within the vehicle to detect occurrence of a power failure. The control unit 600 detects the power failure and, simultaneously, receives information about a first speed corresponding to a first acceleration command input by a driver from the vehicle speed calculation/storage unit 500, the control unit 600 controls the motor 400 to maintain the first speed as long as the drivers steps on the accelerator pedal 112. The acceleration command may refer to the degree to which the accelerator pedal 112 is being pressed and may be input by the driver so as to drive the vehicle at a desired velocity.

The control unit 600 includes a monitoring unit 610, a power controller 620, and a travel controller 630.

The monitoring unit 610 monitors a power status of the vehicle to detect occurrence of a power failure. In particular, the monitoring unit 610 detects a power failure from the power unit 300 and the control unit 600 and monitors a DC-Link voltage, which is a voltage on a path for transmitting a high voltage generated by the power unit 300 to the motor 400. The monitoring unit 610 may compare a power status for the power unit 300 and the control unit 600 with a detection reference value to detect occurrence of the power failure. The monitoring unit 610 may also compare a DC-Link voltage/current with a detection reference value to detect occurrence of the power failure.

The power controller 620 stabilizes the detected power failure, and accordingly stabilizes the vehicle. To do so, the power controller 620 reduces regenerative braking or travelling loads.

The regenerative braking is a process whereby the motor 400 coupled to a drive shaft operates as the electric generator 320 to convert a kinetic energy of the vehicle traveling at certain speed into an electric energy and charge the battery 330, and the charged battery is used to drive the motor 400. Specifically, when the driver operates the brake pedal 113 while driving to reduce the speed of the vehicle, the vehicle experiences a force of inertia that will cause the vehicle to continue moving. At this time, the motor 400 is inversely driven due to the force of inertia and works as the electric generator 320 to generate electricity and charge the battery 330 using the electricity. Generating a large amount of electricity due to regenerative braking may damage the motor 400 or cause an overcharge of the battery 330 and may result in explosion of the battery 330. Thus, the power controller 620 may reduce the regenerative braking (or brake the vehicle slowly) during a power failure to generate a proper amount of electricity, thereby stabilizing the power failure in the vehicle.

Reducing traveling loads refers to decreasing the speed of the vehicle. This is because power-related devices such as the engine 310, the electric generator 320, the battery 330, the inverter 340, and the converter 350 may be damaged or broken when the speed of the vehicle increases or exceeds the speed limit by pressing on the accelerator pedal 112. The power controller 620 may stabilize the power failure in the vehicle by reducing the travelling loads (or decreasing the speed of the vehicle) during the power failure.

Upon detection of a power failure during monitoring, the travel controller 630 receives the first acceleration command generated upon the detection of power failure and the information about the first speed corresponding to the first acceleration command from the vehicle speed calculation/storage unit 500 and controls the vehicle to travel at the first speed.

Upon receiving an additional acceleration command (hereinafter referred to as a "second acceleration command") due to a degree of pressing of the accelerator pedal 112 while the vehicle moves at the first speed, the travel controller 630 compares the second acceleration command with the first acceleration command. If a second speed corresponding to the second acceleration command is greater than the first speed corresponding to the first acceleration command (i.e. the degree of pressing of the accelerator pedal 112 of the second acceleration command is greater than the degree of pressing of the accelerator pedal 112 of the first acceleration command), the travel controller 630 may control the vehicle to continue to travel at the first speed. On the other hand, if a second speed corresponding to the second acceleration command is less than the first speed corresponding to the first acceleration command (i.e. the degree of pressing of the accelerator pedal 112 of the second acceleration command is less than the degree of pressing of the accelerator pedal 112 of the first acceleration command), the travel controller 630 may receive the second acceleration command and the information about the second speed corresponding to the second acceleration command from the vehicle speed calculation/storage unit 500 and control the vehicle to travel at the second speed.

On the other hand, if the control unit 600 does not receive the additional acceleration command (second acceleration command) from the accelerator pedal 112 while the vehicle moves at the first speed, the travel controller 630 controls the motor 400 to gradually decrease the speed of the vehicle so that the vehicle comes to a complete stop. Further, after the vehicle completely stops during the power failure, the travel controller 630 may suppress movement of the vehicle even if a starter signal for moving the stopped vehicle is received.

When the power controller 620 stabilizes the power failure by reducing regenerative braking, the travel controller 630 may then restore the vehicle to a normal state and control the vehicle to travel at a speed corresponding to a received acceleration command. Alternatively, even if the power failure is stabilized, the travel controller 630 may control the vehicle to continue to travel at the first speed as the maximum speed of the vehicle.

For example, upon detecting a power failure while a driver is driving a vehicle at a speed of 70 km per hour, the control unit 600 may maintain the driving speed of 70 km per hour as a first speed. In this case, if an additional acceleration command, i.e., a second acceleration command, indicating a speed above 70 km per hour (e.g., 80 km per hour), is received from the driver, the control unit 600 may not increase the driving speed but maintain first speed of 70 km per hour while driving. Otherwise, if the additional acceleration command, i.e., the second acceleration command, indicating a speed (e.g., 60 km per hour) below 70 km per hour, is received from the driver, the control unit 600 controls the vehicle to travel at a second speed of 60 km per hour corresponding to the second acceleration command. The control unit 600 may also compare a subsequent additional acceleration command (e.g. a third acceleration command) with the second acceleration command and maintain the second speed while driving or control the vehicle to travel at a third speed corresponding to the third acceleration command and being lower than the second speed according to the result of comparison. However, if the additional acceleration command is not received, the speed of the vehicle gradually decreases so that the vehicle comes to a complete stop.

Thereafter, when the power failure is eliminated and thus the vehicle is stabilized, the vehicle may travel at the speed of 80 km per hour according to a driver's acceleration command indicating a speed such as 80 km per hour.

As discussed previously, when the power failure is eliminated, and thus the vehicle is stabilized, the vehicle is free to travel according to a driver's additional acceleration command. However, the speed of 70 km per hour may be stored as the first speed in the vehicle in the control unit 600 or the vehicle speed calculation/storage unit 500 since the power failure will likely occur again when the driving speed reaches the first speed. Thus, even if the power failure in the vehicle is eliminated, the control unit 600 may prevent the driver from increasing the driving speed above the first speed of 70 km per hour for a predetermined period of time, or may remind the driver to be alert by giving a warning that a power failure has previously occurred at this speed of 70 km per hour.

The operation of the control unit 600 will now be described in more detail with reference to a table shown in FIG. 3 according to an exemplary embodiment.

The monitoring unit 610 may monitor a DC-Link voltage, and if the DC-Link voltage exceeds a first predetermined voltage, e.g., 720 V, the monitoring unit 610 detects a power failure called "DC-Link overvoltage." Upon detection of the power failure "DC-Link overvoltage," a power supply failure occurs. In this case, the power controller 620 may reduce regenerative braking to stabilize the power failure. In addition, the travel controller 630 receives a first acceleration command generated upon the detection of the power failure "DC-Link overvoltage" and information about a first speed corresponding thereto from the vehicle speed calculation/storage unit 500 and controls the vehicle to travel at the first speed.

Upon receiving an additional acceleration command, i.e., a second acceleration command due to a change in a degree of pressing of the accelerator pedal 112 while the vehicle travels at the first speed, the travel controller 630 compares the degree of pressing of the accelerator pedal 112 corresponding to the second acceleration command with the first acceleration command. If the degree of pressing of the accelerator pedal 112 corresponding to the second acceleration command is greater than the degree of pressing of the accelerator pedal 112 corresponding to the first acceleration command, the travel controller 630 may control the vehicle to continue to travel at the first speed. On the other hand, if the degree of pressing of the accelerator pedal 112 corresponding to the second acceleration command is less than the degree of pressing of the accelerator pedal 112 corresponding to the first acceleration command, the travel controller 630 may receive the second acceleration command and information about a second speed corresponding thereto from the vehicle speed calculation/storage unit 500 and control the vehicle to travel at the second speed. On the other hand, if the control unit 600 does not receive the additional acceleration command (second acceleration command) from the accelerator pedal 112 while the vehicle moves at the first speed, the travel controller 630 controls the motor 400 to gradually decrease the speed of the vehicle so that the vehicle comes to a complete stop.

If the power controller 620 stabilizes the power failure by reducing regenerative braking, the travel controller 630 may then restore the vehicle to a normal state and control the vehicle to travel at the speed corresponding to the received acceleration command. Alternatively, even if the power failure is stabilized, the travel controller 630 may control the vehicle to continue to travel at the first speed as a maximum speed for a predetermined time.

The monitoring unit 610 may monitor a DC-Link voltage, and if the DC-Link voltage falls below a second predetermined voltage, e.g., 560 V, detect a power failure called "DC-Link undervoltage 1." Upon detection of the power failure "DC-Link undervoltage 1," a power supply failure occurs. In this case, the power controller 620 may reduce travelling loads to stabilize the power failure. In addition, the travel controller 630 receives a first acceleration command generated upon the detection of the power failure "DC-Link undervoltage 1" and information about a first speed corresponding thereto from the vehicle speed calculation/storage unit 500 and controls the vehicle to travel at the first speed. Since the driving of the vehicle according to reception and non-reception of an additional acceleration command and after eliminating and stabilizing the power failure is controlled in the same manner as described above, a detailed description thereof is omitted.

The monitoring unit 610 may monitor a DC-Link voltage, and if the DC-Link voltage falls below a third predetermined voltage, e.g., 500 V, detect a power failure called "DC-Link undervoltage 2." Upon detection of the power failure "DC-Link undervoltage 2," it is impossible to supply power. In this case, the power controller 620 may reduce travelling loads to stabilize the power failure. In addition, the travel controller 630 receives a first acceleration command generated upon the detection of the power failure "DC-Link undervoltage 2" and information about a first speed corresponding thereto from the vehicle speed calculation/storage unit 500 and controls the vehicle to travel at the first speed.

The monitoring unit 610 may monitor a DC-Link current, and if the DC-Link current exceeds a first predetermined current, e.g., 440 A, the monitoring unit 610 detects a power failure called "DC-Link overcurrent." Upon detection of the power failure "DC-Link overcurrent," a power supply failure occurs. In this case, the power controller 620 may reduce travelling loads and regenerative braking to stabilize the power failure. The travel controller 630 receives a first acceleration command generated upon the detection of the power failure "DC-Link overcurrent" and information about a first speed corresponding thereto from the vehicle speed calculation/storage unit 500 and controls the vehicle to travel at the first speed.

The monitoring unit 610 may monitor an output current of the battery 330 that is fed to the converter 350, and if the output current of the battery 330 exceeds a second predetermined current, e.g., 300 A, the monitoring unit 610 detects a power failure called "converter overcurrent." Upon detection of the power failure "converter overcurrent," a power supply is unavailable. In this case, the power controller 620 may reduce travelling loads and regenerative braking to stabilize the power failure. In addition, the travel controller 630 receives a first acceleration command generated upon the detection of the power failure "converter overcurrent" and information about a first speed corresponding thereto from the vehicle speed calculation/storage unit 500 and controls the vehicle to travel at the first speed.

The monitoring unit 610 may monitor a temperature of an IGBT (not shown) in the converter 350, and if the temperature of the IGBT exceeds a first predetermined IGBT temperature, e.g., 150°, the monitoring unit 610 detects a power failure called "converter IGBT overheating." Upon detection of the power failure "converter IGBT overheating," a power supply failure occurs. In this case, the power controller 620 may reduce travelling loads to stabilize the power failure. In addition, the travel controller 630 receives a first acceleration command generated upon the detection of the power failure "converter IGBT overheating" and information about a first speed corresponding thereto from the vehicle speed calculation/storage unit 500 and controls the vehicle to travel at the first speed.

The monitoring unit 610 may monitor a temperature of an inductor (not shown) in the converter 350, and if the temperature of the inductor exceeds an predetermined inductor temperature, e.g., 150°, the monitoring unit 610 detects a power failure called "converter inductor overheating." Upon detection of the power failure "converter inductor overheating," a power supply failure occurs. In this case, the power controller 620 may reduce travelling loads to stabilize the power failure. In addition, the travel controller 630 receives a first acceleration command generated upon the detection of the power failure "converter inductor overheating" and information about a first speed corresponding thereto from the vehicle speed calculation/storage unit 500 and controls the vehicle to travel at the first speed.

The monitoring unit 610 may monitor a discharged state of the battery 330, and if the battery 330 has an available discharge power (varying with battery type) that exceeds a predetermined discharging power for a predetermined period of time, the monitoring unit 610 detects a power failure called "battery overdischarging" Upon detection of the power failure "battery overdischarging," a power supply failure occurs. In this case, the power controller 620 may reduce travelling loads to stabilize the power failure. In addition, the travel controller 630 receives a first acceleration command generated upon the detection of the power failure "battery overdischarging" and information about a first speed corresponding thereto from the vehicle speed calculation/storage unit 500 and controls the vehicle to travel at the first speed.

The monitoring unit 610 may monitor a charged state of the battery 330, and if the battery 330 has an available charge power (varying with battery type) that exceeds a predetermined overcharging power for a predetermined period of time, the monitoring unit 610 detects a power failure called "battery overcharging." Upon detection of the power failure "battery overcharging," a power supply failure occurs. In this case, the power controller 620 may reduce travelling loads and regenerative braking to stabilize the power failure. In addition, the travel controller 630 receives a first acceleration command generated upon the detection of the power failure "battery overcharging" and information about a first speed corresponding thereto from the vehicle speed calculation/storage unit 500 and controls the vehicle to travel at the first speed.

The monitoring unit 610 may monitor a voltage of a cell in the battery 330, and if the cell voltage exceeds a first predetermined voltage, e.g., 328 V, the monitoring unit 610 detects a power failure called "battery cell overvoltage." Upon detection of the power failure "battery cell overvoltage," a power supply failure occurs. In this case, the power controller 620 may reduce travelling loads and regenerative braking to stabilize the power failure. In addition, the travel controller 630 receives a first acceleration command generated upon the detection of the power failure "battery cell overvoltage" and information about a first speed corresponding thereto from the vehicle speed calculation/storage unit 500 and controls the vehicle to travel at the first speed.

The monitoring unit 610 may monitor a voltage of a cell in the battery 330, and if the cell voltage falls below a second predetermined voltage, e.g., 264 V, the monitoring unit 610 detects a power failure called "battery cell undervoltage." Upon detection of the power failure "battery cell undervoltage," a power supply failure occurs. In this case, the power controller 620 may reduce travelling loads to stabilize the power failure. In addition, the travel controller 630 receives a first acceleration command generated upon the detection of the power failure "battery cell undervoltage" and information about a first speed corresponding thereto from the vehicle speed calculation/storage unit 500 and controls the vehicle to travel at the first speed.

The monitoring unit 610 may monitor a temperature of the battery 330, and if the temperature of the battery 330 exceeds a predetermined battery temperature, e.g., 150°, for a predetermined period of time, the monitoring unit 610 detects a power failure called "battery overheating." Upon detection of the power failure "battery overheating," a power supply failure occurs. In this case, the power controller 620 may reduce travelling loads to stabilize the power failure. In addition, the travel controller 630 receives a first acceleration command generated upon the detection of the power failure "battery overheating" and information about a first speed corresponding thereto from the vehicle speed calculation/storage unit 500 and controls the vehicle to travel at the first speed.

The monitoring unit 610 may monitor an output current of the electric generator 320 that is fed to the inverter 340, and if the output current of the electric generator 320 exceeds a predetermined generator current, e.g., 350 A, the monitoring unit 610 detects a power failure called "inverter overcurrent." Upon detection of the power failure "inverter overcurrent," it is impossible to supply power. In this case, the power controller 620 may reduce travelling loads to stabilize the power failure. In addition, the travel controller 630 receives a first acceleration command generated upon the detection of the power failure "inverter overcurrent" and information about a first speed corresponding thereto from the vehicle speed calculation/storage unit 500 and controls the vehicle to travel at the first speed.

The monitoring unit 610 may monitor a temperature of the electric generator 320, and if the temperature of a winding wire around the electric generator 320 exceeds a predetermined generator temperature, e.g., 130°, the monitoring unit 610 detects a power failure called "generator overheating." Upon detection of the power failure "generator overheating," a power supply failure occurs. In this case, the power controller 620 may reduce travelling loads to stabilize the power failure. In addition, the travel controller 630 receives a first acceleration command generated upon the detection of the power failure "generator overheating" and information about a first speed corresponding thereto from the vehicle speed calculation/storage unit 500 and controls the vehicle to travel at the first speed.

The monitoring unit 610 may monitor a temperature of an IGBT (not shown) in the inverter 340, and if the temperature of the IGBT exceeds a second predetermined IGBT temperature, e.g., 110°, detect a power failure called "inverter IGBT overheating." Upon detection of the power failure "inverter IGBT overheating," a power supply failure occurs. In this case, the power controller 620 may reduce travelling loads to stabilize the power failure. In addition, the travel controller 630 receives a first acceleration command generated upon the detection of the power failure "inverter IGBT overheating" and information about a first speed corresponding thereto from the vehicle speed calculation/storage unit 500 and controls the vehicle to travel at the first speed.

Although the monitoring unit 610 monitors the power unit 300, the control unit 600, and the DC-Link voltage to detect a power failure, the monitoring unit 610 may also monitor a power failure of electric components to control the driving of the vehicle.

The power failure monitored by the monitoring unit 610 may be displayed on the display unit 114 so that the driver can see the power failure. In this case, a "warning lamp" may be lighted together. Furthermore, when the power failure is eliminated, elimination of the power failure may also be displayed on the display unit 114, thus informing the driver of the elimination. In this case, a "warning cancel lamp" may also be lighted together. The "warning lamp" and the "warning cancel lamp" may be separated from or integrated with each other. When the "warning lamp" and the "warning cancel lamp" are integrated with each other, their colors may be different. For example, the "warning lamp" and "warning cancel lamp" may be available in red and green, respectively.

The manipulation unit 115 is configured to include a switch (not shown) or button (not shown) for receiving and setting a user's input so that the vehicle travels at a first speed upon detection of the power failure. Upon receiving the user's input from the switch, an operation corresponding to the user's input may be automatically performed.

Upon occurrence of a power failure while a vehicle travels, continuous driving may be allowed by preventing an increase in driving speed of the vehicle, thereby improving driving reliability. Furthermore, limiting the speed during the power failure may allow a driver who failed to notice a display indicating occurrence of the power failure to detect an abnormal condition of the vehicle. In addition, a driver may be granted authorities to determine continuance of driving or a decrease in travelling speed during a power failure in a vehicle, thereby removing driver's uneasiness of a failure to control an abnormal condition of the vehicle.

Figure 4:
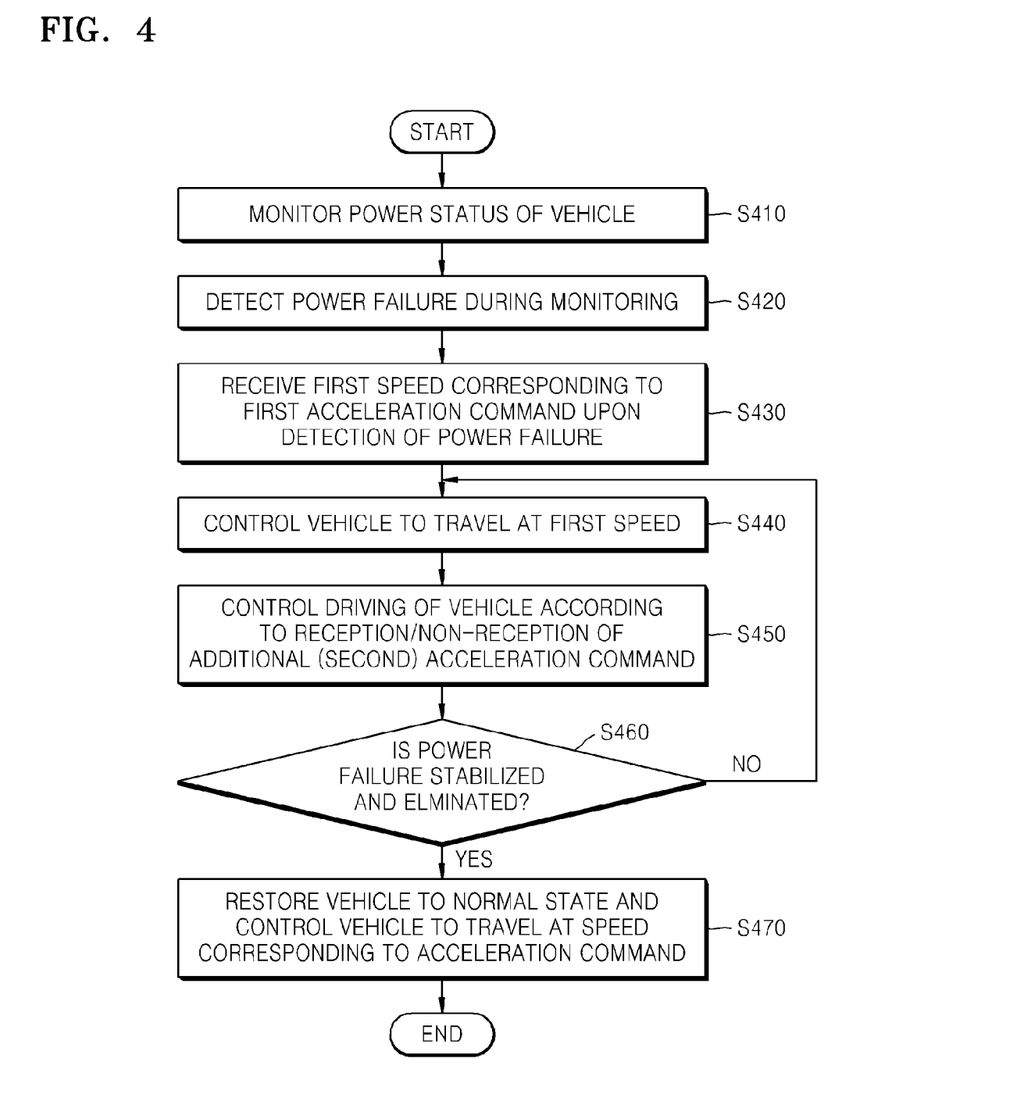
FIG. 4 is a flowchart illustrating operations of a method of driving a vehicle according to an exemplary embodiment.

FIG. 4 is a flowchart illustrating operations of a method of driving a vehicle according to an exemplary embodiment. The control unit 600 may perform the method according to the present exemplary embodiment as shown in FIG. 4 by cooperating with surrounding components as illustrated in FIGS. 1 and 2. Repeated descriptions with respect to FIGS. 1 through 3 are omitted to avoid redundancy.

Referring to FIG. 4, the control unit 600 monitors a power status of a vehicle (S410). The control unit 600 may monitor the power status of the power unit 300 and the control unit 600 itself as well as a DC-Link voltage, which is a voltage on a path for transmitting a high voltage generated by the power unit 300 to the motor 400. While monitoring the power status of the vehicle, the control unit 600 detects a power failure (S420). The control unit 600 may compare the power status for the power unit 300 and the control unit 600 with a detection reference value to detect occurrence of the power failure. The control unit 600 may also compare a DC-Link voltage/current with a detection reference value to detect occurrence of the power failure.

Upon detection of the power failure during monitoring, the control unit 600 receives a first acceleration command generated upon the detection of a power failure and information about the first speed corresponding thereto from the vehicle speed calculation/storage unit 500 (S430) and controls the vehicle to travel at the first speed (S440). When a power failure occurs during driving of the vehicle, the control unit 600 prevents an increase in driving speed of the vehicle to allow continuous driving of the vehicle, thereby improving driving reliability.

Figure 5:
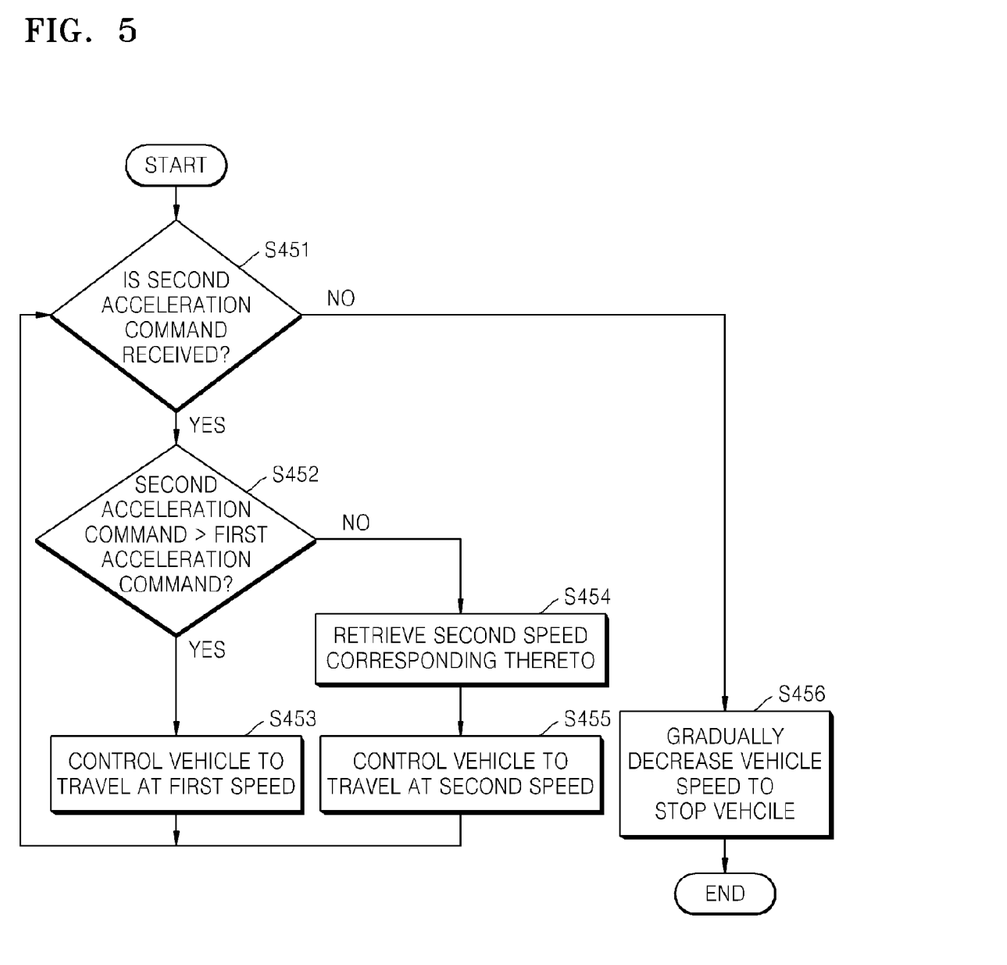
FIG. 5 is a flowchart illustrating operations of a method of controlling driving of a vehicle according to reception and non-reception of an additional acceleration command in FIG. 4 according to an exemplary embodiment.

Thereafter, while the vehicle travels at the first speed, the control unit 600 controls driving of the vehicle according to one of reception and non-reception of an additional acceleration command (a second acceleration command) (S450). FIG. 5 is a flowchart illustrating operations of a method of controlling driving of a vehicle according to reception and non-reception of an additional acceleration command in FIG. 4 according to an exemplary embodiment.

Referring to FIG. 5, the control unit 600 determines whether the additional acceleration command has been received from the accelerator pedal 112 while the vehicle travels at the first speed (S451).

When the additional acceleration command is received from the accelerator pedal 112 while the vehicle travels at the first speed, the control unit 600 compares the second acceleration command with the first acceleration command to determine whether the second acceleration command is greater than the first acceleration command (S452). That is, as described previously, the control unit 600 compares the degree of pressing of the accelerator pedal 112 corresponding to the second acceleration command and the degree of pressing of the accelerator pedal 112 corresponding to the first acceleration command.

If the degree of pressing of the second acceleration command is greater than that of the first acceleration command, the control unit 600 controls the vehicle to continue to travel at the first speed (S453). That is, even if an additional acceleration command is received from the accelerator pedal 112, the control unit 600 controls the vehicle to continue to travel at the first speed.

In comparison, if the degree of pressing of the second acceleration command is less than that of the first acceleration command, the control unit 600 retrieves information about a second speed corresponding thereto from the vehicle speed calculation/storage unit 500 (S454) and control the vehicle to travel at the second speed (S455).

On the other hand, if the additional acceleration command (the second acceleration command) is not received from the accelerator pedal 112 while the vehicle travels at the first speed, the control unit gradually decreases the speed of the vehicle so that the vehicle comes to a stop (S456). Further, after the vehicle comes to a complete stop during the power failure, the control unit may suppress movement of the vehicle even if a starter signal for moving the stopped vehicle is received.

Referring back to FIG. 4, the control unit 600 then determines whether the power failure in the vehicle travelling at the first or second speed has been stabilized for elimination (S460). The control unit 600 may stabilize the vehicle by stabilizing the detected power failure. The control unit 600 reduces regenerative braking or travelling loads to stabilize the detected power failure as described previously.

When the power failure is stabilized by reducing regenerative braking and/or traveling loads, the control unit 600 restores the vehicle to a normal state and controls the vehicle to travel at a speed corresponding to a subsequently received acceleration command (S470). However, even if the power failure is stabilized, the control unit 600 may control the vehicle to continue to travel at the first speed as a maximum speed of the vehicle.

For example, upon detecting a power failure while a driver is driving a vehicle at a speed of 60 km per hour, the control unit 600 may maintain the driving speed of 60 km per hour as a first speed. In this case, if an additional acceleration command, i.e., a second acceleration command, indicating a speed (e.g., 70 km per hour) above 60 km per hour, is received from the driver, the control unit 600 may not increase the driving speed but maintain first speed of 60 km per hour while driving. On the other hand, if the additional acceleration command, i.e., the second acceleration command, indicating a speed (e.g., 50 km per hour) below 60 km per hour, is received from the driver, the control unit 600 controls the vehicle to travel at a second speed of 50 km per hour corresponding to the second acceleration command. The control unit 600 may also compare a subsequent additional acceleration command (e.g. a third acceleration command) with the second acceleration command and maintain the second speed while driving or control the vehicle to travel at a third speed corresponding to the third acceleration command and that is lower than the second speed according to the result of comparison. However, if the second acceleration command is not received, the speed of the vehicle gradually decreases so that the vehicle comes to a complete stop.

Thereafter, when the power failure is eliminated, and thus the vehicle is stabilized, the vehicle may travel at the speed of 70 km per hour according to a driver's additional acceleration command indicating a speed such as 70 km per hour.

Furthermore, when the power failure is eliminated and thus the vehicle is stabilized, the vehicle is free to travel according to a driver's additional acceleration command. However, the speed of 60 km per hour is stored as the first speed in the vehicle, and the power failure will most likely to occur again when the driving speed reaches the first speed. Thus, even if the power failure in the vehicle is eliminated, the control unit 600 may prevent the driver from increasing the driving speed above the first speed of 60 km per hour for a predetermined period of time, or remind the driver to be alert by giving a warning that a power failure has previously occurred at this speed.

The present inventive concept may be embodied as a computer-readable code on a computer-readable storage medium. The computer-readable storage medium is any data storage device that can store data which can be thereafter read by a computer system.

Examples of computer-readable storage media include read-only memory (ROM), random-access memory (RAM), CD-ROMs, magnetic tapes, floppy disks, optical data storage devices, and carrier waves (e.g., transmission through the Internet). The computer-readable storage media can also be distributed over network coupled computer systems so that computer-readable codes are stored and executed in a distributed fashion. Furthermore, functional programs, codes, and code segments for accomplishing exemplary embodiments can be easily programmed by programmers skilled in the art to which the inventive concept pertains.

While exemplary embodiments have been described above, it will be understood by one of ordinary skill in the art that various changes in form and details may be made therein without departing from the spirit and scope of the present inventive concept as defined by the following claims.

What is claimed is:

1. A method of driving a vehicle, the method comprising:
   monitoring a power status of the vehicle while driving at a first speed corresponding to a first acceleration command;
   detecting a power failure during the monitoring;
   receiving a second acceleration command at a state of maintaining the first speed, and calculating a second speed corresponding to the second acceleration command; and
   controlling the vehicle to maintain the first speed while driving if the second speed is greater than the first speed and controlling the vehicle to travel at the second speed if the second speed is less than the first speed, based on a comparison between the first speed and the second speed,
   wherein the controlling the vehicle comprises setting a maximum speed of the vehicle based on the calculated first speed corresponding to the driving speed of the vehicle when the power failure occurs.

2. The method of claim 1, further comprising, if a second acceleration command is not received while the vehicle travels at the first speed, gradually decreasing the speed of the vehicle to a stop.

3. The method of claim 2, further comprising suppressing movement of the stopped vehicle in response to the power failure.

4. The method of claim 1, further comprising,
   stabilizing the power failure; and controlling the vehicle to travel at a speed corresponding to a subsequently received acceleration command in response to the stabilized power failure, wherein the stabilizing the power failure comprises at least one of reducing regenerative braking and reducing travelling loads.

5. The method of claim 1, further comprising, stabilizing the power failure; and controlling the vehicle to travel at a speed less than or equal to the first speed even in response to the stabilized power failure, wherein the stabilizing the power failure comprises at least one of reducing regenerative braking and reducing travelling loads.

6. The method of claim 1, further comprising, stabilizing the power failure, the stabilizing the power failure comprising reducing regenerative braking.

7. The method of claim 1, wherein the maximum speed is determined by the driving speed of the vehicle when the power failure occurs.

8. An apparatus for driving a vehicle, the apparatus comprising:

a processor configured to calculate a speed of the vehicle including a first speed and a second speed based on a first acceleration command and a second acceleration command, respectively;

a memory configured to store the first speed and the second speed; and a controller configured to monitor a power status of the vehicle while the vehicle travels at the first speed corresponding to the first acceleration command, to detect a power failure during the monitoring, to control the vehicle to maintain a driving speed at the first speed, to receive the second acceleration command at a state of the vehicle maintaining the first speed, to control the vehicle to maintain the first s seed while driving if the second speed is greater than the first speed and to control the vehicle to travel at the second speed if the second speed is less than the first speed, based on a comparison between the first speed and the second speed, wherein the controller is configured to set a maximum speed of the vehicle based on the calculated first speed corresponding to the driving speed of the vehicle when the power failure occurs.

9. The apparatus of claim 8, wherein in response to the second acceleration command not being received while the vehicle travels at the first speed, the controller is configured to gradually decrease the speed of the vehicle to a stop.

10. The apparatus of claim 9, wherein the controller is configured to suppress movement of the stopped vehicle in response to the power failure.

11. The apparatus of claim 8, wherein in response to the power failure being stabilized by a power controller of the controller, the controller is configured to control the vehicle to travel at a speed corresponding to a subsequently received acceleration command, wherein the power controller is configured to stabilize the power failure by performing at least one of reduction of regenerative braking and reduction of travelling loads.

12. The apparatus of claim 8, wherein in response to the power failure being stabilized by a power controller of the controller, the controller is configured to control the vehicle to maintain a speed less than or equal to the first speed while driving, wherein the power controller stabilizes the power failure by performing at least one of reduction of regenerative braking and reduction of travelling loads.

13. The apparatus of claim 8, wherein in response to the power failure being stabilized by a power controller of the controller, the power controller is configured to stabilize the power failure by reducing regenerative braking.

14. The apparatus of claim 8, wherein the maximum speed is determined by the driving speed of the vehicle when the power failure occurs.

* * * * *